United States Patent
Ju (10) Patent No.: US 7,355,315 B2
(45) Date of Patent: Apr. 8, 2008

(54) DRUM TYPE WASHING MACHINE WITH ROTOR AND SHAFT HAVING INTERLOCKING CONNECTION MECHANISM

(75) Inventor: Haeng Sik Ju, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 156 days.

(21) Appl. No.: 11/289,273

(22) Filed: Nov. 30, 2005

(65) Prior Publication Data
US 2006/0119213 A1 Jun. 8, 2006

(30) Foreign Application Priority Data
Dec. 3, 2004 (KR) .................. 10-2004-0100944

(51) Int. Cl.
*H02K 1/28* (2006.01)
(52) U.S. Cl. ........................ 310/261; 310/91
(58) Field of Classification Search ............. 310/42, 310/91, 261
See application file for complete search history.

(56) References Cited

U.S. PATENT DOCUMENTS 3,575,621 A * 4/1971 Voland et al. ............. 310/112

FOREIGN PATENT DOCUMENTS

| JP | 61-106038 | 5/1986 |
|----|-----------|--------|
| JP | 09-285051 | 10/1997 |
| JP | 2000-192983 | 7/2000 |

* cited by examiner

*Primary Examiner*—Tran Nguyen
(74) *Attorney, Agent, or Firm*—Bacon & Thomas, PLLC

(57) ABSTRACT

A rotor of motor for drum type washing machine comprises a stator formed of a field winding; a rotor disposed outside the stator to house the stator, and having a yoke surface on which a permanent magnet for performing a magnetic interaction with the field winding of the stator, the rotor rotating around the stator; a shaft bushing for connecting the rotor and the rotation shaft, which is installed on the bottom surface, wherein a plurality of the rotation groove portions whose width of one side is more narrowly formed than whose width of other side are formed at regular intervals on the bottom surface of the rotor, wherein fixed protrusion which is inserted the rotation groove portions and is fixed when moved along the rotation groove portions by rotation of the shaft bushing is protruded on the bottom surface of the shaft bushing.

1 Claim, 8 Drawing Sheets

DRUM TYPE WASHING MACHINE WITH ROTOR AND SHAFT HAVING INTERLOCKING CONNECTION MECHANISM

FIELD OF THE INVENTION

The present invention relates to a rotor of motor for drum type washing machine; and, more particularly, to a rotor of motor for drum type washing machine, wherein combining method of the rotor and shaft bushing is changed, thus reducing assembling time, and the number of the components is reduced, thus cutting down the manufacturing cost.

BACKGROUND OF THE INVENTION

In general, a drum type washing machine performs a washing on laundry articles by using a gravitational potential energy produced when it rotates a cylindrical drum repeatedly in a water tub to lift them to an upper portion of the drum and then allow them to drop.

Such the drum type washing machine is advantageous in that damages caused to the laundry articles by their entangling and an amount of washing water can be reduced when compared with pulsator type and agitator type washing machines.

Figure 1:
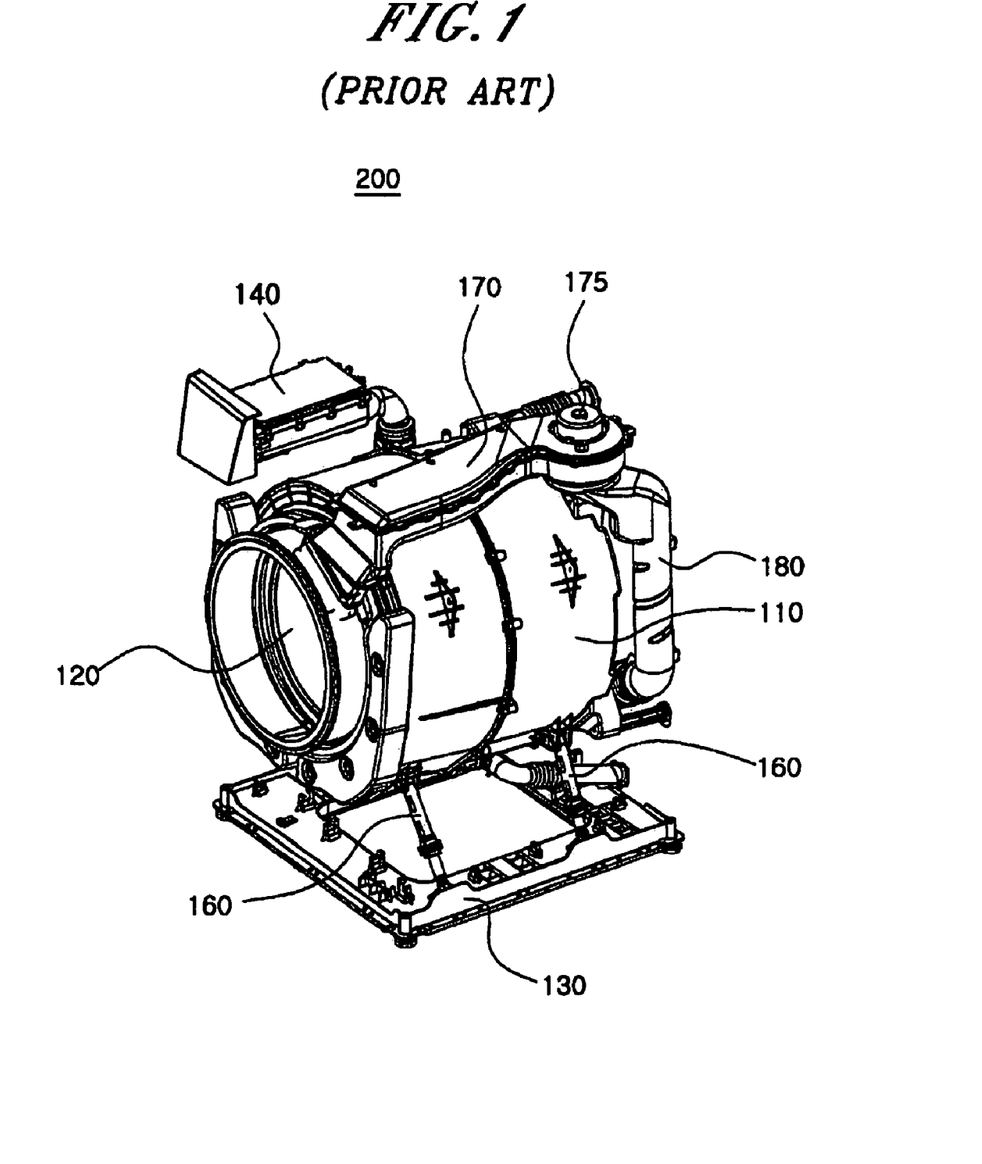
FIG. 1 is an essential part perspective view of a conventional drum type washing machine.

Such the drum type washing machine, as shown in FIG. 1, includes a drum 120, for providing a washing space, rotatably installed in a water tub 110 horizontally installed on an upper portion of a base 130, and a detergent supply container 140, for supplying a washing detergent including a washing assisting agent, such as a fabric softening agent, installed above the water tub 110. Further, between an upper portion of a housing (not shown) and the water tub 10, a plurality of tensile coil springs (not shown) are installed to absorb vibrations and impacts produced by a rotation and stop of the drum 120 or falling of the laundry articles during the washing and dewatering process.

Further, between a lower portion of the housing and the water tub 110, oil dampers 160 are installed. So the vibration and the impacts can be reduced more effectively by the damping action of the dampers 160 along with the elastic force of the coil springs.

The drum type washing machine 200 with the configuration described above usually has a drying function and allows a drying process to be performed after completing the washing and dewatering process. Therefore, the drum type washing machine 200 further includes a drying device in an upper and rear portion thereof, which is provided with a chamber 170 having a heater therein, a blower 175 and a condensation duct 180. The drying device circulates a drying air repeatedly into the inside of the drum 120 and condenses moisture contained in the drying air, thus drying the laundry articles.

Meanwhile, on a rear surface of the water tub 110 of the drum type washing machine 200, a motor for rotating the drum 120 is provided. Such the driving motor is usually constructed by an electric induction motor in which a rotational force is generated by an interaction between a rotating magnetic field generated in a stator and an inductive magnetic field generated in the rotor. The electric induction motor can be designed in various ways, i.e., it can be designed as a three-phase induction motor, a three-phase winding type induction motor and so forth as well as a single-phase induction motor. And it has a capability to maintain a constant rotational speed and a long lifetime.

The electric induction motor used as the driving motor of the drum type washing machine 200 basically includes a stator generating an induced magnetism by receiving a power from outside via a winding coil wound around a core and a rotator rotating a rotation shaft of the drum 120 combined therewith through a shaft coupler by the induced magnetism generated by the stator.

In the electric induction motor with the above-described configuration, an electric current is induced to a secondary winding by an electromagnetic induction of a primary winding which is connected to a power supply, and a rotary power is obtained by an interaction between the current induced at the secondary winding and a rotating magnetic field. Such an electric induction motor can be classified into an inner rotor type or an outer rotor type depending on relative locations of the stator and the rotor.

In the inner rotor type motor, since the rotor rotates in the stator, a diameter of the rotor is restricted. Therefore, it has a disadvantage that a torque per unit volume is low. And an inner space thereof cannot be used.

Recently, an outer rotor type induction motor having a rotor installed outside a stator has wide applications, because it is capable of increasing a torque at a same volume, and, by using the outer rotor type motor, it is possible to use the inner space of the stator for another purpose.

Figure 2:
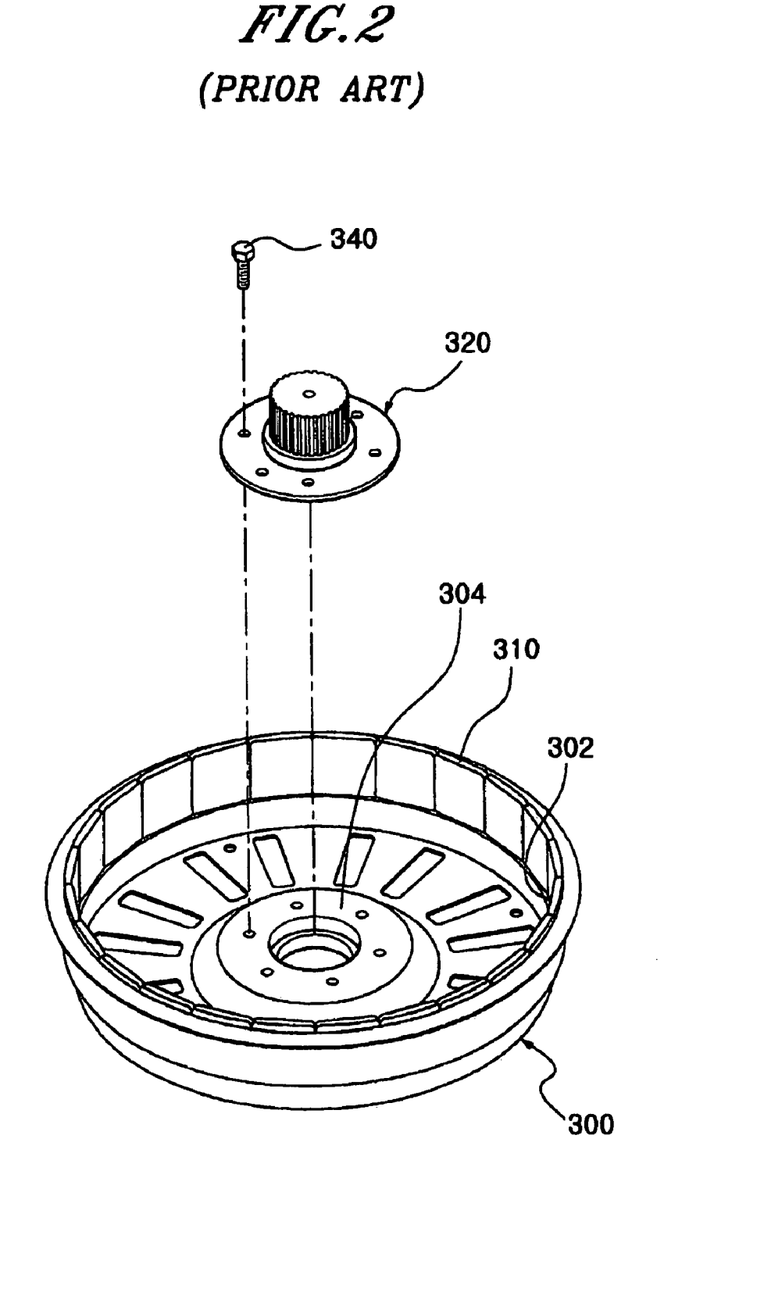
FIG. 2 present a perspective view of a rotor constituting an outer rotor type motor of the conventional drum type washing machine.
Figure 3:
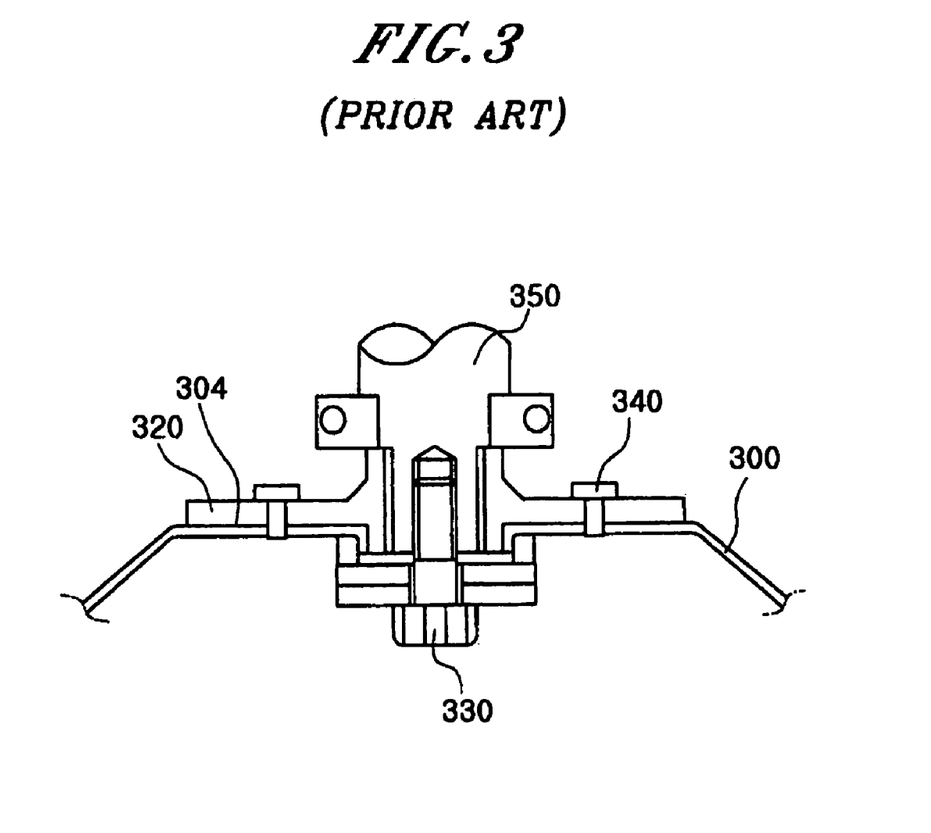
FIG. 3 depicts a cross sectional view of the combining state of shaft bushing and rotor shown in FIG. 2.

The rotor of the outer rotor type induction motor is, as shown in FIG. 2, manufactured to be shaped into a hollow cylinder according to a drawing method by a press.

As shown in FIG. 2, yoke unit 302 having stepped portion is formed inner peripheral surface. Permanent magnets are combined via the yoke unit 302 respectively. A shaft bushing 320 is installed on the bottom surface for combining the rotor 300 and the drum shaft 350.

As described above, the shaft bushing 320 is used for transferring rotation force of rotating rotor 300. FIG. 2 presents a view about combining the rotor 300 and shaft bushing 320.

As shown in FIG. 2, shaft bushing 320 is set up to shaft 350, and after that shaft bushing 320 is clamped with bolts 330. When clamped, the shaft bushing 320 is assembled with bottom surface unit 304 of rotor 300 by clamping means 340.

But, in the configure of the rotor 300, the combination of the rotor 300 and shaft bushing 320 is clamped by clamping means 340, and thus the number of the components are increased and manufacturing cost is increased.

And there is problem that it takes much time to assemble rotor 300 and shaft bushing 320.

SUMMARY OF THE INVENTION

It is, therefore, an object of the present invention to provide a rotor of motor for drum type washing machine, wherein combining method of the rotor and shaft bushing is changed, thus reducing assembling time, and the number of the components is reduced, thus cutting down the manufacturing cost.

In accordance with the present invention, there is provided a rotor of motor for drum type washing machine comprising: a stator formed of a field winding; a rotor disposed outside the stator to house the stator, and having a yoke surface on which a permanent magnet for performing a magnetic interaction with the field winding of the stator, the rotor rotating around the stator; a shaft bushing for connecting the rotor and the rotation shaft, which is installed on the bottom surface, wherein a plurality of the rotation groove portions whose width of one side is narrowly formed than whose width of other side are formed at regular intervals on the bottom surface of the rotor, wherein fixed protrusion which is inserted the rotation groove portions and is fixed when moved along the rotation groove portions by rotation of the shaft bushing is protruded on the bottom surface of the shaft bushing.

In accordance with the present invention, there is provided a rotor, wherein hooks which comprises guide surface and locking end are protruded on the center part of one side of rotation groove portions.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
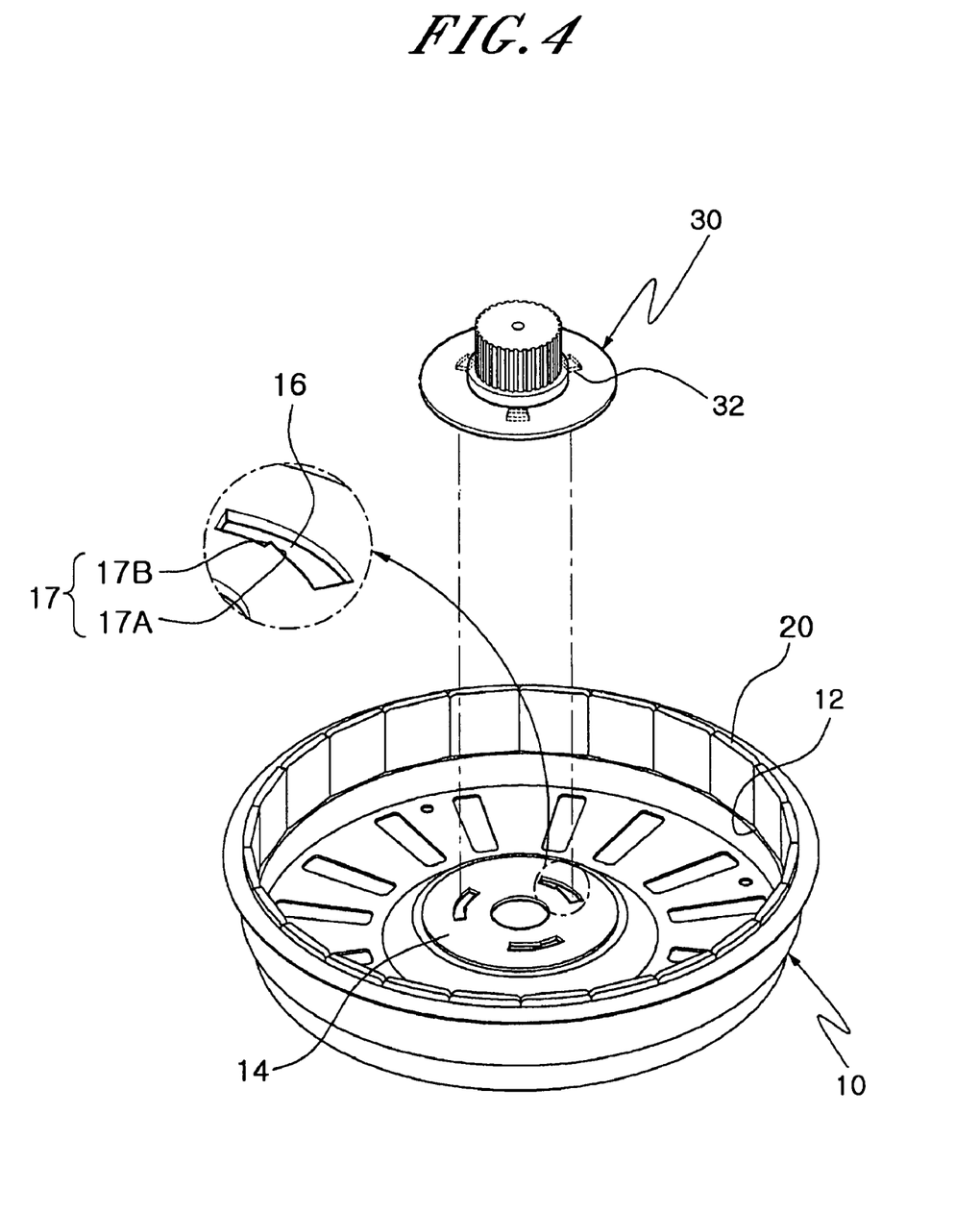
FIG. 4 offers a perspective view of a rotor in accordance with an embodiment of the present invention.
Figure 5:
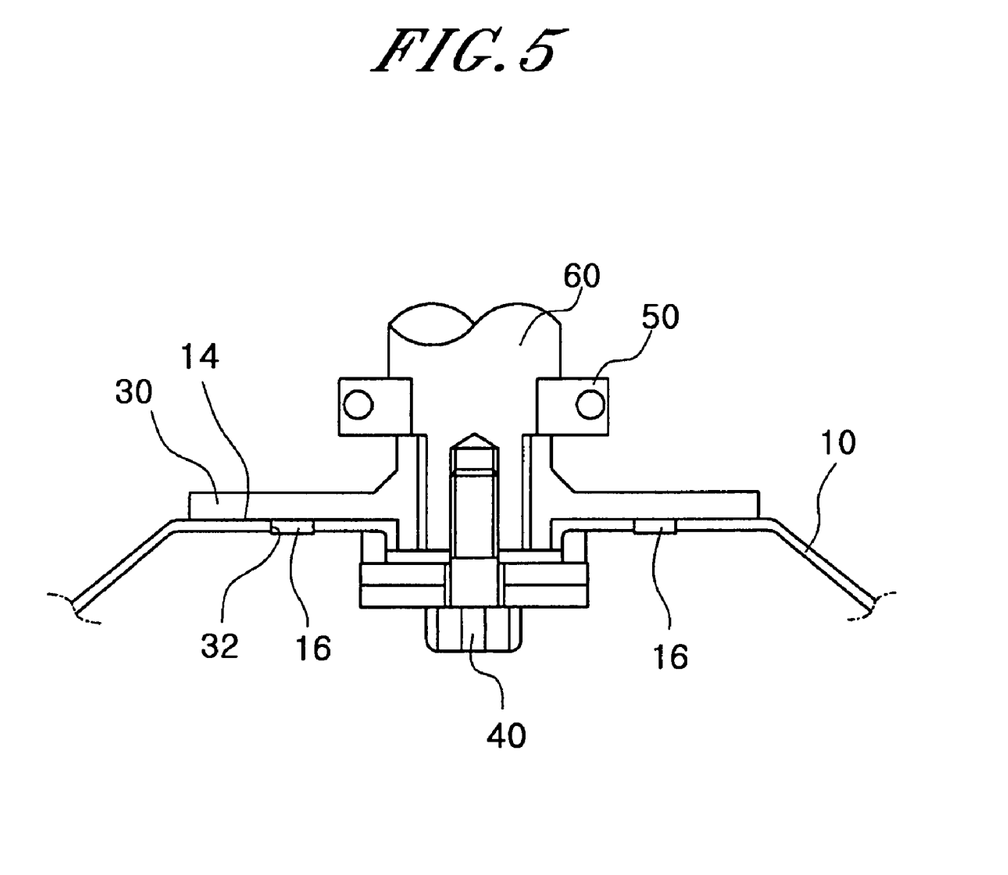
FIG. 5 illustrates a cross sectional view of the combining state of shaft bushing and rotor in accordance with an embodiment of the prensent invention.

Preferred embodiments of the present invention will now be described in detail with reference to the accompanying drawings, In the accompanying drawings, FIG. 4 is a perspective view of the rotor, and FIG. 5 is a cross sectional view of the combining state of shaft bushing in accordance with an embodiment of the present invention.

As described above, roter of outer rotor motor 10 in accordance with an embodiment of the present invention manufactured to be shaped into a hollow cylinder according to a drawing method by a press. Totally detail configuration is formed of simple after-treatment process after press processing.

As after-treatment process for the detail configuration, opening is formed in the middle of pressing processed hollow cylinder shaped rotor. And after that, shaft bushing 30 is installed to set up shaft 60 for rotating of the rotor.

On the rotor 10 processed by the press, yoke unit 12 having stepped portion inner peripheral surface is formed. Permanent magnet is attached for performing a magnetic interaction with the field winding of the stator on the yoke unit 12.

A plurality of the rotation groove portions whose width of one side is narrowly formed than whose width of other side are formed at regular intervals on the bottom surface of the rotor which forms hollow cylinder shaped bottom.

Hooks which comprises guide surface and locking end are protruded on the center part of one side of rotation groove portions.

The hook 17 is desirable to be made of elasticity material.

The fixed protrusion 32 which is inserted the rotation groove portions and is fixed when moved along the rotation groove portions by rotation of the shaft bushing 30 is protruded on the bottom surface of the shaft bushing 30 which is installed on the bottom surface 14 of the rotor 10 for setting up shaft 60 to transfer rotation of rotor 10.

The fixed protrusion 32 is for preventing from moving to one side of rotation groove portions 16 by locking end 17B of hook 17.

Accordingly, it is easy to install shaft bushing 30 into the rotor 10, and the shaft bushing is not separated from the rotor by the fixed protrusion 32 and the hook 17.

An operation of the rotor, with the configuration described above, in accordance with the present invention will be described.

Figure 6A:
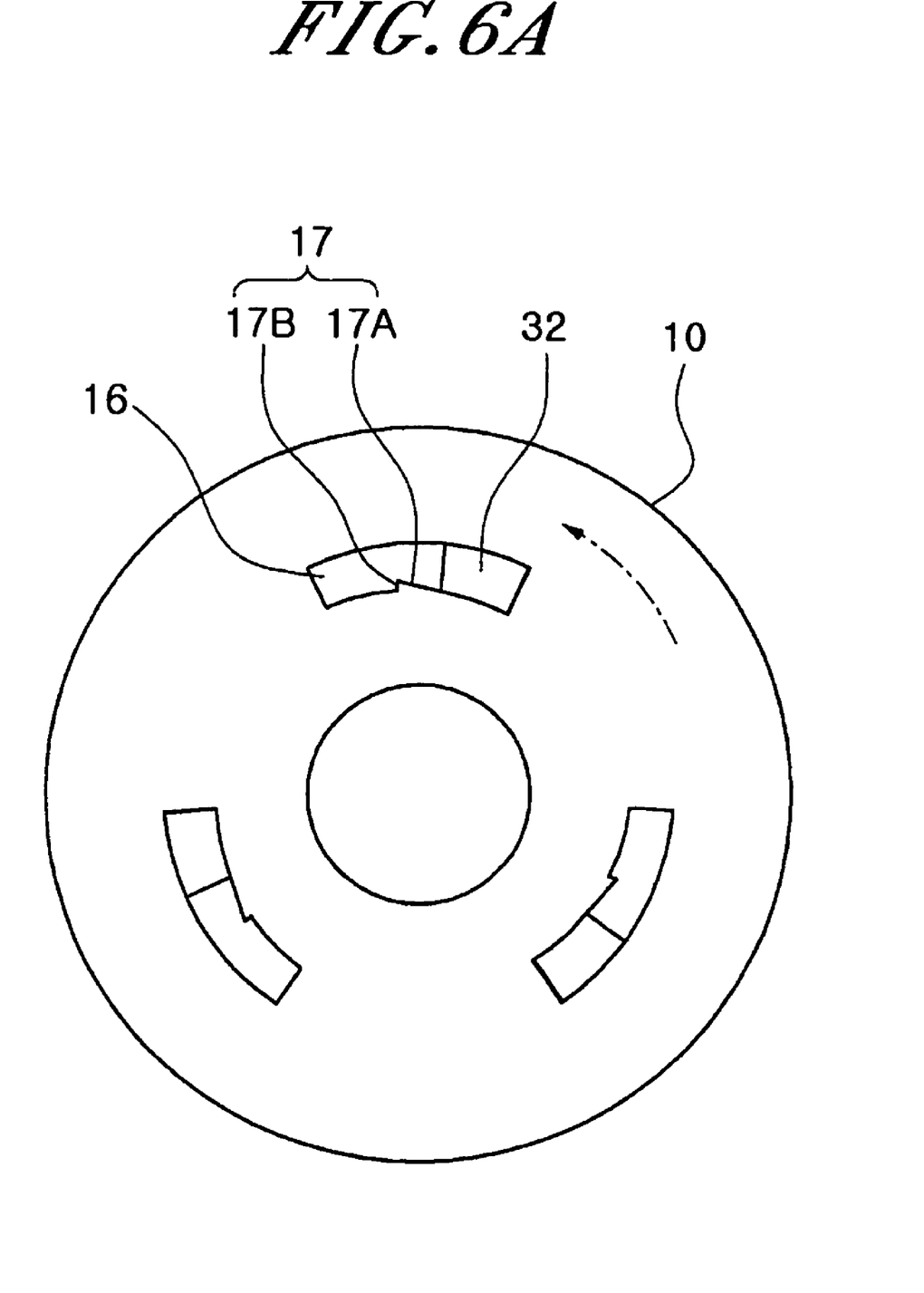
FIGS. 6a, 6b and 6c set forth view of the combining state of shaft bushing and rotor in accordance with an embodiment of the prensent invention.

To install shaft bushing 30 into the rotor 10, first insert fixed protrusion 32 which is formed on the bottom surface of the shaft bushing 30. At that time locate fixed protrusion 32 one side of the rotation groove portions whose width is more broadly formed than other side's width.

Figure 6B:
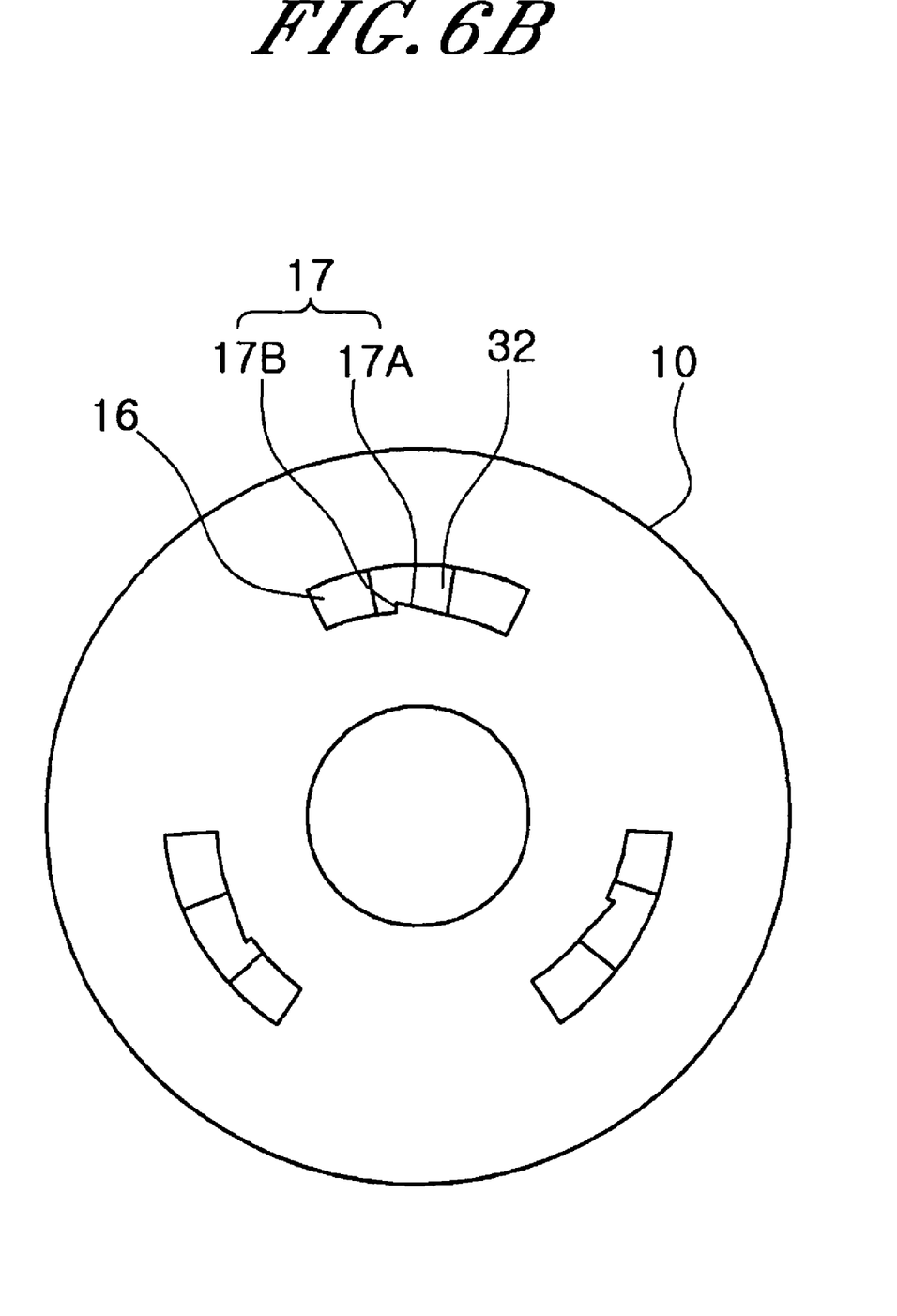

In this state, when shaft bushing 30 is rotated in the arrow direction, a fixed protrusion 32 is moved along the guide surface 17A of hook 17. And when a fixed protrusion 32 is moved along the guide surface 17A to be located the other end of the rotation groove portions 16 whose width is narrow, the fixed protrusion 32 is combined into the other end of the rotation groove portions 16 compulsorily, and fixed with locking by locking end 17B of hook 17, as described FIG. 6c, and thus the shaft bushing 30 is combined into the rotor 10.

Figure 6C:
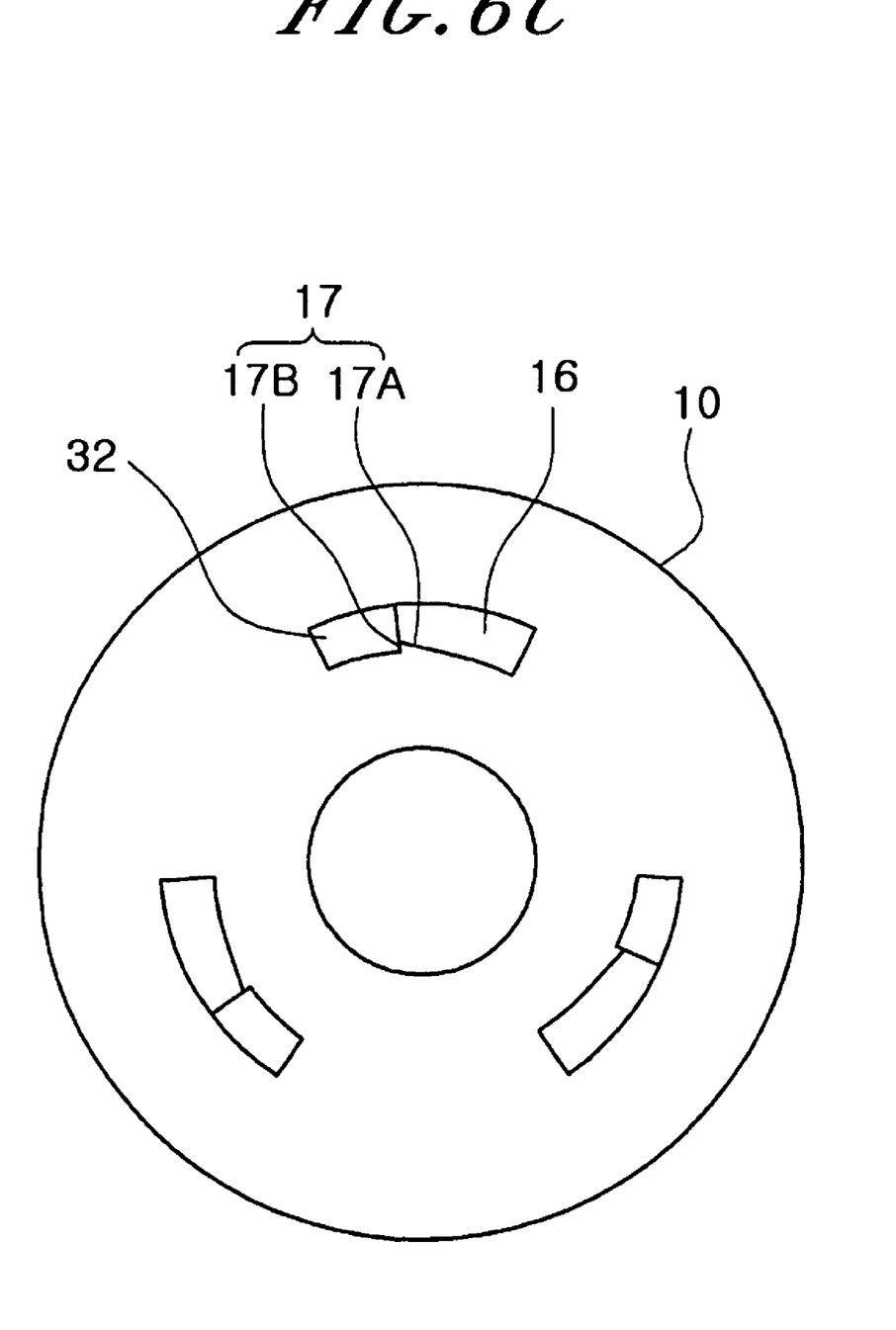

When the fixed protrusion 32 is moved along the guide surface 17A, hook 17 is contracted by its elasticity. And when the fixed protrusion 32 of located at the other side of narrow-width rotation groove portion, the fixed protrusion 32 is retuned to normal. Accordingly, the fixed protrusion 32 is locked on locking end of hook, and that prevents the fixed protrusion 32 from moving to one end.

After rotor 10 is combined with shaft bushing 30, the shaft bushing 30 is set up to shaft 60, and clamped with bolts 40.

Therefore shaft bushing 30 connect shaft 60 to rotor 10, rotating force of rotor is transfered to shaft 60, combining of rotor 10 and shaft bushing 30 is easy, and the number of the components is reduced, thus cutting down the manufacturing cost.

When the washing machine is performed by the motor which has the rotor 10 configured as described above, the permanent magnet is attached to yoke unit 12 of the rotor 10 for rotor to perform a magnetic interaction with the field winding of the stator on the yoke unit 12 and the rotor performs a magnetic interaction optimally to rotate with optimal ratating force, and thus the rotating force is transferred to shaft bushing 30 which is installed on the bottom surface 14 of the rotor 10.

Therefore, rotation force transferred to shaft bushing 30 is supported by inner bearing. By rotation of shaft bushing 30, a drum molded with shaft bushing 30 as a unit is rotated and the washing is performed.

What is claimed is:

1. A rotor of motor for drum type washing machine comprising:
 a stator formed of a field winding;
 a rotor disposed outside the stator to house the stator, and having a yoke surface on which a permanent magnet for performing a magnetic interaction with the field winding of the stator, the rotor rotating around the stator; and a shaft bushing for connecting the rotor and the rotation shaft, which is installed on the bottom surface, wherein a plurality of the rotation groove portions whose width of one side is more narrowly formed than whose width of other side are formed at regular intervals on the bottom surface of the rotor, wherein fixed protrusion which is inserted the rotation groove portions and is fixed when moved along the rotation groove portions by rotation of the shaft bushing is protruded on the bottom surface of the shaft bushing, wherein hooks which comprises guide surface and locking end are protruded on the center part of one side of rotation groove portions.

* * * * *